United States Patent
Indiresan et al.

(10) Patent No.: US 10,581,738 B2
(45) Date of Patent: Mar. 3, 2020

(54) EFFICIENT INTER-VLAN ROUTING IN OPENFLOW NETWORKS

(71) Applicant: Cisco Technology, Inc., San Jose, CA (US)

(72) Inventors: Atri Indiresan, Sunnyvale, CA (US); Manas Pati, San Jose, CA (US); Christophe Rene, Gatineau (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/956,639

(22) Filed: Apr. 18, 2018

(65) Prior Publication Data

US 2019/0230034 A1     Jul. 25, 2019

Related U.S. Application Data

(60) Provisional application No. 62/619,628, filed on Jan. 19, 2018.

(51) Int. Cl.
| | |
|---|---|
| *H04L 12/741* | (2013.01) |
| *H04L 12/931* | (2013.01) |
| *H04L 12/707* | (2013.01) |
| *H04L 12/46* | (2006.01) |

(52) U.S. Cl.
CPC .......... *H04L 45/74* (2013.01); *H04L 12/4645* (2013.01); *H04L 45/22* (2013.01); *H04L 49/354* (2013.01)

(58) Field of Classification Search
CPC ..... H04L 45/74; H04L 45/22; H04L 12/4645; H04L 49/354
See application file for complete search history.

(56) References Cited

U.S. PATENT DOCUMENTS

| | | | | |
|---|---|---|---|---|
| 5,751,967 | A | * | 5/1998 | Raab .................. H04L 41/0893 709/220 |
| 9,172,743 | B2 | * | 10/2015 | Shi ...................... H04L 67/1097 |
| 2010/0118739 | A1 | * | 5/2010 | Fiaschi .................. H04L 45/02 370/256 |
| 2011/0317559 | A1 | | 12/2011 | Kern et al. |
| 2014/0016647 | A1 | | 1/2014 | Yoshida et al. |

(Continued)

OTHER PUBLICATIONS

Open Networking Foundation, "OpenFlow Switch Specification," Version 1.5.1 (protocol version 0x06), Mar. 26, 2016, 283 pages.

(Continued)

*Primary Examiner* — Curtis A Alia
(74) *Attorney, Agent, or Firm* — Patterson + Sheridan, LLP (57) ABSTRACT

In embodiments disclosed herein involve receiving a first packet, where the first packet originated from a first device on a first virtual local area network (VLAN) in a first plurality of VLANs, where routing is enabled among each of the first plurality of VLANs. A first temporary value is assigned to a first VLAN identifier associated with the first packet, where the first temporary value corresponds to the first plurality of VLANs. Additionally, the first packet is processed based on a plurality of flow tables. Further, a first destination value is assigned to the first VLAN identifier, where the first destination value corresponds to a second VLAN in the first plurality of VLANs, and the first packet is transmitted to a second device on the second VLAN.

20 Claims, 6 Drawing Sheets

(56) References Cited

U.S. PATENT DOCUMENTS

2014/0313937 A1* 10/2014 Roper ................ H04L 45/02
370/255
2015/0043589 A1 2/2015 Han et al.

OTHER PUBLICATIONS

Faucet SDN: Inter VLAN routing, 3 pages, Accessed Online Apr. 5, 2018, https://faucet-sdn.blogspot.com/2017/03/inter-vlan-routing.html.

* cited by examiner

| FORWARDING INFORMATION BASE | | 405 |
|---|---|---|
| RULE | ACTION | |
| VLAN ID = 110a AND DEST = 120a | Set VLAN ID to 110a | 412 |
| VLAN ID = 110a AND DEST = 120b | Set VLAN ID to 110a | 414 |
| VLAN ID = 110a AND DEST = 120c | Set VLAN ID to 110b | 416 |
| VLAN ID = 110a AND DEST = 120d | Set VLAN ID to 110c | 418 |
| VLAN ID = 110a AND DEST = 120e | Set VLAN ID to 110c | 420 |
| VLAN ID = 110b AND DEST = 120a | Set VLAN ID to 110a | 422 |
| VLAN ID = 110b AND DEST = 120b | Set VLAN ID to 110a | 424 |
| VLAN ID = 110b AND DEST = 120c | Set VLAN ID to 110b | 426 |
| VLAN ID = 110b AND DEST = 120d | Set VLAN ID to 110c | 428 |
| VLAN ID = 110b AND DEST = 120e | Set VLAN ID to 110c | 430 |
| VLAN ID = 110c AND DEST = 120a | Set VLAN ID to 110a | 432 |
| VLAN ID = 110c AND DEST = 120b | Set VLAN ID to 110a | 434 |
| VLAN ID = 110c AND DEST = 120c | Set VLAN ID to 110b | 436 |
| VLAN ID = 110c AND DEST = 120d | Set VLAN ID to 110c | 438 |
| VLAN ID = 110c AND DEST = 120e | Set VLAN ID to 110c | 440 |

| FORWARDING INFORMATION BASE | | 450 |
|---|---|---|
| RULE | ACTION | |
| VLAN ID = 1100 AND DEST = 120a | Set VLAN ID to 110a | 456 |
| VLAN ID = 1100 AND DEST = 120b | Set VLAN ID to 110a | 458 |
| VLAN ID = 1100 AND DEST = 120c | Set VLAN ID to 110b | 460 |
| VLAN ID = 1100 AND DEST = 120d | Set VLAN ID to 110c | 462 |
| VLAN ID = 1100 AND DEST = 120e | Set VLAN ID to 110c | 464 |

EFFICIENT INTER-VLAN ROUTING IN OPENFLOW NETWORKS

CROSS-REFERENCE TO RELATED APPLICATIONS

This application claims benefit of U.S. provisional patent application Ser. No. 62/619,628, filed Jan. 19, 2018. The aforementioned related patent application is herein incorporated by reference in its entirety.

TECHNICAL FIELD

Embodiments presented in this disclosure generally relate to network routing. More specifically, embodiments disclosed herein relate to efficient routing between VLANs in an OpenFlow network.

BACKGROUND

Local Area Networks (LANs) are used in computer networking to connect computers within a defined area, such as a building, office, school, and the like. Virtual LANs (VLANs) allow the partitioning of a single physical LAN into multiple virtual networks (VLANs). Often, VLANs are used to create logical subsets of computers in a network (e.g., one VLAN for each department in a single office). In order for computers or devices on separate VLANs to communicate, however, inter-VLAN routing must be implemented by a router or switch that provides a connection between the VLANs.

OpenFlow is a communications protocol that allows administrators to control the forwarding plane of network switches and routers remotely, such that the network devices can be programmed remotely. This enables software defined networking (SDN), which allows for administrators to manage the network through software via a remote controller rather than by managing each physical switch or router individually. Although OpenFlow allows for inter-VLAN routing (e.g., through FAUCET SDN), current implementations are inefficient and do not scale well when larger numbers of VLANs are present in the network. Therefore, there is a need for improved inter-VLAN routing in OpenFlow networks.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

According to one embodiment presented in this disclosure, a method is provided. The method includes receiving a first packet, wherein the first packet originated from a first device on a first virtual local area network (VLAN) in a first plurality of VLANs, wherein routing is enabled among each of the first plurality of VLANs. The method also includes assigning a first temporary value to a first VLAN identifier associated with the first packet, wherein the first temporary value corresponds to the first plurality of VLANs, and processing the first packet based on a plurality of flow tables. Further, the method includes assigning a first destination value to the first VLAN identifier, wherein the first destination value corresponds to a second VLAN in the first plurality of VLANs. Finally, the method includes transmitting the first packet to a second device on the second VLAN.

According to a second embodiment of the present disclosure, a computer program product is provided. The computer program product includes a computer-readable storage medium having computer-readable program code embodied therewith. The computer-readable program code is executable by one or more computer processors to perform an operation. The operation comprises receiving a first packet, wherein the first packet originated from a first device on a first virtual local area network (VLAN) in a first plurality of VLANs, wherein routing is enabled among each of the first plurality of VLANs. The operation also includes assigning a first temporary value to a first VLAN identifier associated with the first packet, wherein the first temporary value corresponds to the first plurality of VLANs, and processing the first packet based on a plurality of flow tables. Further, the operation includes assigning a first destination value to the first VLAN identifier, wherein the first destination value corresponds to a second VLAN in the first plurality of VLANs. Finally, the operation includes transmitting the first packet to a second device on the second VLAN.

According to a third embodiment of the present disclosure, a networking device is disclosed. The networking device comprises one or more computer processors and a memory containing a program which, when executed by the one or more computer processors, performs an operation. The operation comprises receiving a first packet, wherein the first packet originated from a first device on a first virtual local area network (VLAN) in a first plurality of VLANs, wherein routing is enabled among each of the first plurality of VLANs. The operation also includes assigning a first temporary value to a first VLAN identifier associated with the first packet, wherein the first temporary value corresponds to the first plurality of VLANs, and processing the first packet based on a plurality of flow tables. Further, the operation includes assigning a first destination value to the first VLAN identifier, wherein the first destination value corresponds to a second VLAN in the first plurality of VLANs. Finally, the operation includes transmitting the first packet to a second device on the second VLAN.

EXAMPLE EMBODIMENTS

In order to route packets, OpenFlow generally uses a series of flow tables that define actions to be performed on each incoming data to ensure it is modified appropriately and arrives at the defined destination. Typically, each entry in a flow table includes a rule that incoming data (e.g., packets or frames) are matched against. If the fields or headers of the incoming data match the rule given in the entry, the defined action associated with that entry is undertaken, which may include proceeding to a second flow table and again checking for a match. As the data proceeds through the flow tables, various fields are frequently changed. Eventually, after processing, the data is output on one or more ports of the switch or router, where it continues through the network towards the destination computer. Although the present disclosure refers to the OpenFlow protocol, embodiments of the present disclosure are also applicable to improve other protocols that are derived from or operate in a functionally similar manner to OpenFlow.

Figure 1:
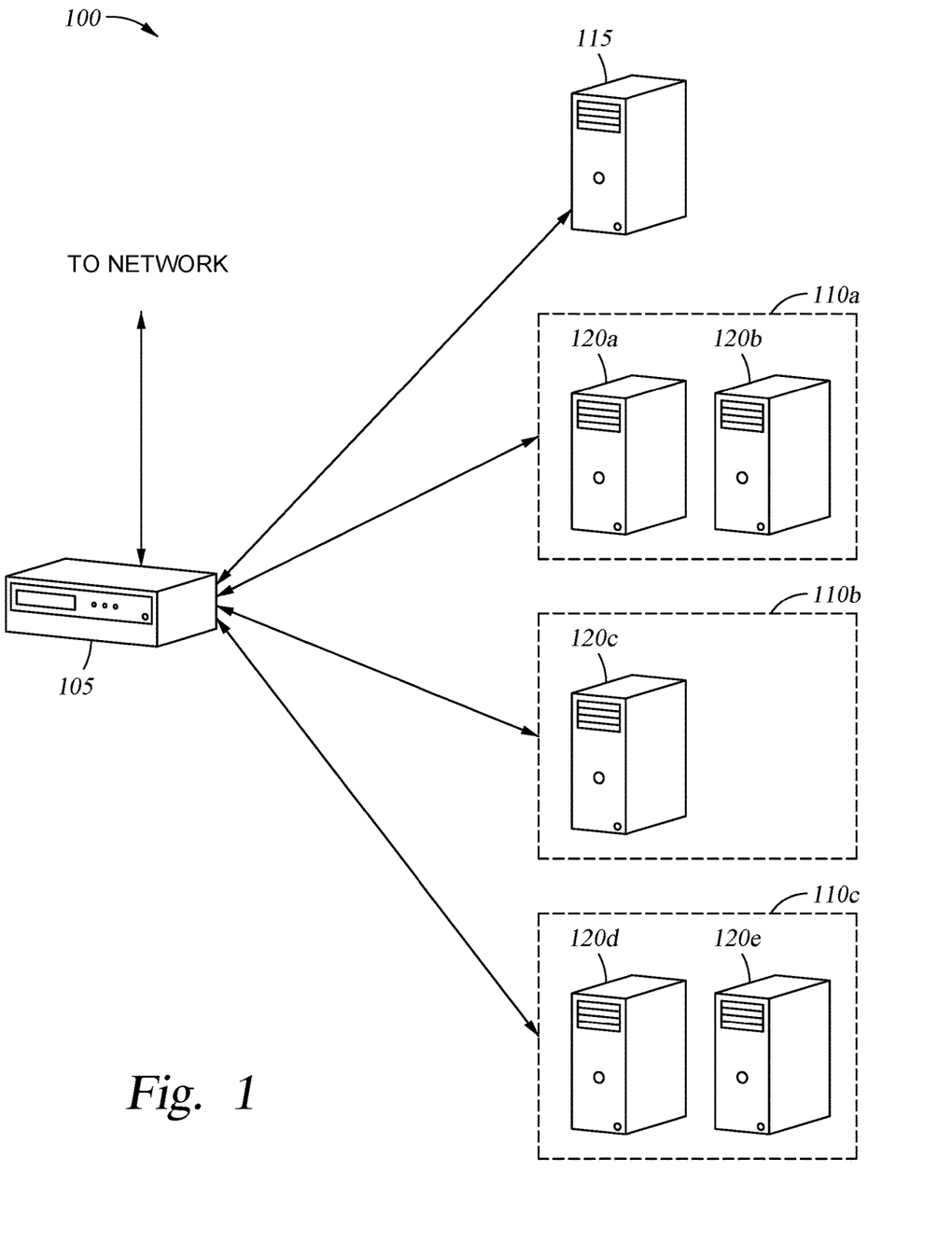
FIG. 1 illustrates a system including a network switch configured to route data between VLANs, according to one embodiment disclosed herein.

FIG. 1 is a system 100 including a network Switch 105 configured to route data between VLANs 110a, 110b, and 110c, according to one embodiment disclosed herein. In various embodiments, a router, layer 3 switch, or other network device capable of implementing any embodiments disclosed herein may be used in place of the Switch 105. Although illustrated as if each Computer 120a-e communicates directly with Switch 105, in some embodiments, there may be one or more additional routers or switches between the Computers 120a-e and the Switch 105. In an embodiment, if inter-VLAN routing is enabled for a set of VLANs 110, the VLANs 110 belong to the same virtual routing and forwarding group (VRF). For example, if only routing between VLANs 110a and 110b is enabled, the VLANs 110a and 110b are associated with a first VRF. Generally, VLANs that are not included within the same VRF cannot route packets to each other.

As illustrated, the Switch 105 is configured to route data (such as layer 3 packets, layer 2 frames, or both) between distinct VLANs, such as VLAN 110a, 110b, and 110c. Additionally, in the illustrated embodiment, the Switch 105 is capable of routing data to and from one or more other networks, such as the Internet. In the illustrated embodiment, Switch 105 is an SDN switch, meaning that the routing and forwarding of the Switch 105 can be defined by a remote device, such as Controller 115. For example, in one embodiment, the Switch 105 is an OpenFlow switch. As discussed above, embodiments of the present disclosure may be implemented on any Switch 105 that utilizes a protocol similar to or derived from OpenFlow. In the illustrated embodiment, VLAN 110a includes Computers 120a and 120b. Similarly, VLAN 110b includes Computer 120c, and VLAN 110c includes Computers 120d and 120e. Although illustrated as desktop computers, Computers 120a-e and Controller 115 may be any computing device, including laptops, tablets, mobile devices, servers, and the like.

In an embodiment, when data is sent between devices on disparate VLANs (e.g., VLAN 110a and VLAN 110b), Switch 105 must, among other processes, update a VLAN identifier field in each packet or frame to refer to the appropriate VLAN before outputting it on one or more ports. For example, in one embodiment, when a packet is transmitted from a device within VLAN 110a, it is associated with a tag (e.g., a header or frame associated with the packet) indicating VLAN 110a. In some embodiments, the packet or header is not associated with such a VLAN ID tag, and Switch 105 modifies the packet by setting or adding a VLAN ID field that indicates VLAN 110a, based on the port that the packet was received on. By the time the packet leaves the Switch 105, however, the VLAN ID must be updated to refer to VLAN 110b, because the packet is being routed towards a machine on VLAN 110b.

In existing solutions, the routing and forwarding of packets depends at least partially on the VLAN ID, which can lead to significant inefficiencies. One solution others have attempted involves routing the packets based on the virtual routing and forwarding (VRF) value of each packet instead of the VLAN ID. However, these solutions are insufficient because the VRF value is maintained as metadata, which many switches are incapable of accessing. Further, even if a switch can process the packets using the VRF metadata, this requires updating the microcode of the switch, which makes implementation difficult. In one embodiment of the present disclosure, to efficiently route between VLANs 110a, 110b, and 110c, Switch 105 utilizes a temporary internal value as a placeholder for the VLAN ID.

In an embodiment, the Switch 105 utilizes an "internal VLAN" that corresponds to the virtual routing and forwarding group (VRF) which includes each VLAN that packets will be routed between. For example, if inter-VLAN routing is specified for two VLANS A and B, the Switch 105 can be configured to define an internal VLAN corresponding to the VRF that includes VLANS A and B. In this way, when a packet originating from either VLAN A or B arrives at the Switch 105, the VLAN ID tag attached to the packet may be temporarily set to the internal VLAN identifier for processing, which dramatically increases the scalability of the Switch 105 and allows for increased performance, as will be discussed below in more detail. In some embodiments, a single Switch 105 may utilize multiple internal values. For example, in an embodiment, the Switch 105 may be configured with multiple internal VLANs, each one including a different set of VLANs. In this way, when a packet is received, the Switch 105 can set the VLAN ID to the appropriate internal value based on which VLAN (which VRF) the packet originated from. This ensures that inter-VLAN routing is enabled for the specified set of VLANs within each temporary internal value, but not between VLANs associated with different internal values.

Figure 2:
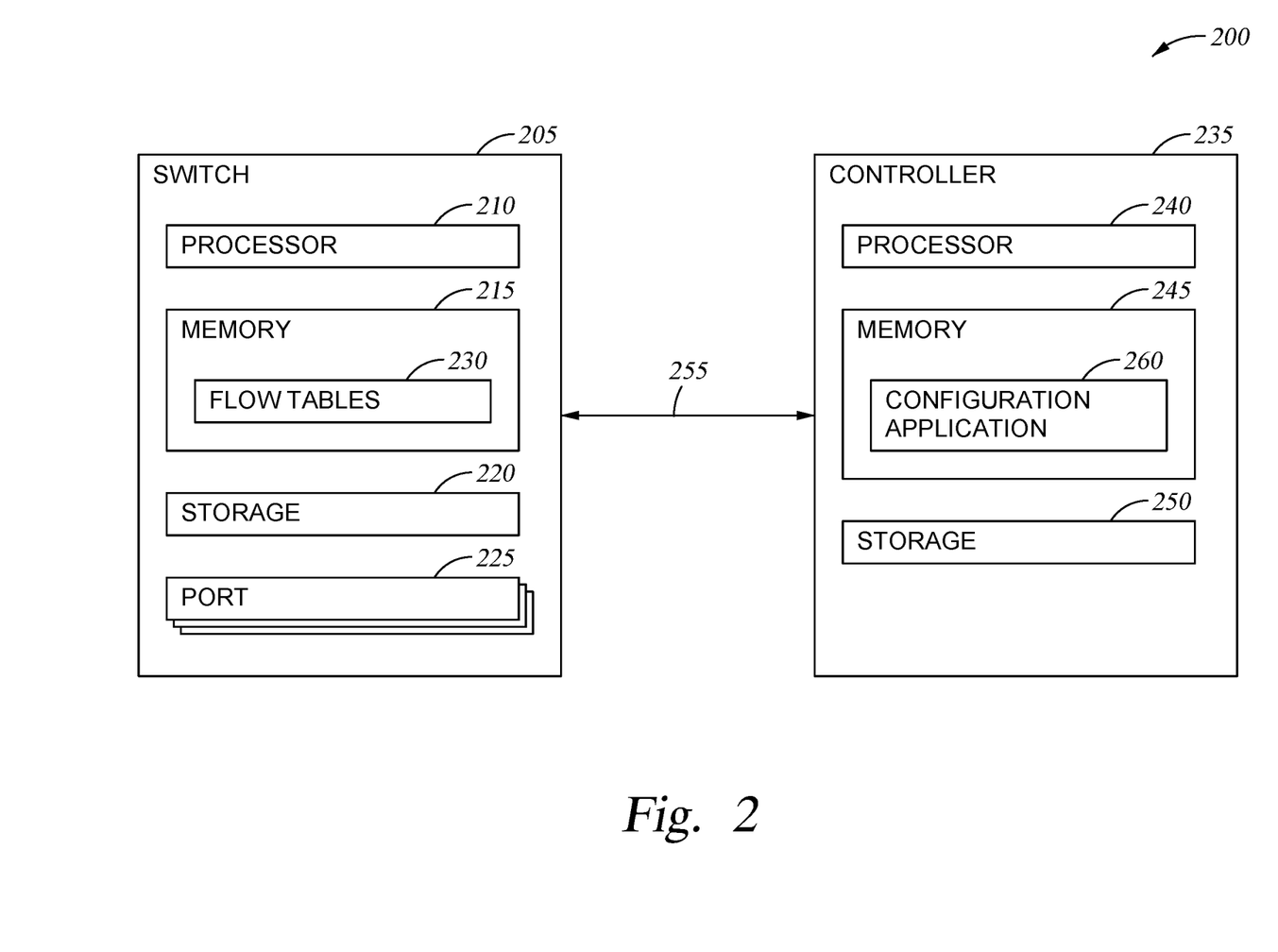
FIG. 2 is a block diagram of a switch and controller configured to perform inter-VLAN routing, according to one embodiment disclosed herein.

FIG. 2 is a block diagram of a Switch 205 and Controller 235 configured to perform inter-VLAN routing, according to one embodiment disclosed herein. As discussed above, in various embodiments the Switch 205 may be a router, switch, or other network device that routes and forwards packets, as discussed herein. In the illustrated embodiment, the Controller 235 can be used by an administrator to programmatically adjust the routing and forwarding behavior of the Switch 205, via communications link 255. For example, in an embodiment, Configuration Application 260 can be used to programmatically change the behavior of Switch 205.

As illustrated, Switch 205 includes a Processor 210, Memory 215, Storage 220, and a number of Ports 225. The Ports 225 provide communications links to the various subnets (e.g., VLANs) and devices that the Switch 205 routes data between. In the illustrated embodiment, the Memory 215 Includes Flow Tables 230. As discussed above, Flow Tables 230 are used to control the routing and forwarding of network data. For example, when a packet or frame is received by Switch 205, fields in the header are compared to entries in a first Flow Table 230 (e.g., flow table 0). If a match is found, the corresponding actions are performed. If not, the packet is either dropped (if there is no "catch-all" entry), or is processed according to the catch-all "table-miss" entry (e.g., by flooding the packet across all ports). Packets continue in this way cascading through the various Flow Tables 230 until they are output on one or more ports.

As illustrated, Controller 235 contains a Processor 240, Memory 245, and Storage 250. In the illustrated embodiment, Processor 240 retrieves and executes programming instructions stored in Memory 245 as well as stores and retrieves application data residing in Storage 250. Processor 240 is representative of a single CPU, multiple CPUs, a single CPU having multiple processing cores, and the like. Memory 245 is generally included to be representative of a random access memory. Storage 250 may be a disk drive storage device, and may include fixed and/or removable storage devices, such as fixed disk drives, removable memory cards, or optical storage, network attached storage (NAS), or storage area-network (SAN).

In an embodiment, the Configuration Application 260 can be used by an administrator to adjust the configuration of the control plane corresponding to the Switch 205, which adjusts the routing and forwarding behavior of the Switch 205. In turn, the Flow Tables 230 are updated and modified based on the configuration and the network topology. In this way, administrators can remotely and programmatically manage the routing and forwarding behavior of the Switch 205.

In an embodiment, the Switch 205 is configured to set the VLAN ID of incoming packets to refer to an internal value when they are received. Additionally, in an embodiment, the Switch 205 is further configured set the VLAN ID of the packets to the VLAN of the destination device, prior to outputting it on one or more Ports 225. In this way, the efficiency and scalability of the Switch 205 inter-VLAN routing is significantly improved.

Figure 3:
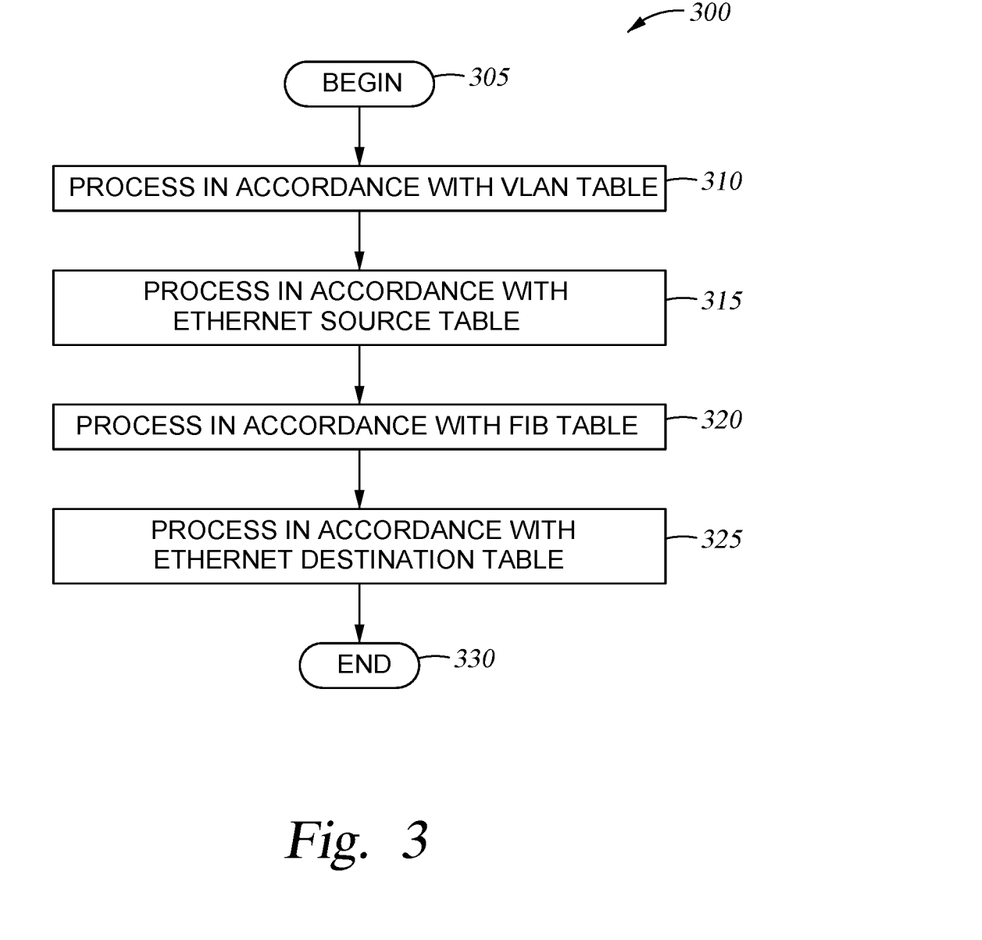
FIG. 3 is a flow diagram illustrating a method used to process packets in a network switch, according to one embodiment discussed herein.

FIG. 3 is a flow diagram illustrating a method 300 used to process packets in a network Switch 205, according to one embodiment discussed herein. In embodiments, when a packet is received by a network Switch 205, it is processed using a sequence of one or more forwarding tables that affect how the data packet is transformed, as well as where the packet is transmitted (e.g., which Port 225 the packet is transmitted over). In embodiments, each packet includes a "data" portion which includes all of the data that is being transmitted, as well as a "header" portion that includes a number of fields or tags used to transmit the packet to the appropriate destination. For example, the header may include a source field, destination field, protocol field, and the like.

The method 300 illustrates one embodiment of a layer 3 forwarding process. As discussed above, in an embodiment, each Flow Table 230 includes a number of rows, where each row specifies a match criteria and one or more actions to take when the match criteria is satisfied. These actions may include proceeding to a different Flow Table 230 for further processing, or modifying fields in the header of the data being transmitted (i.e., a packet). In some embodiments, one or more of the Flow Tables 230 may also have a "catch-all," "table-miss," or "default" match criteria that dictates how packets which do not match any of the rows are to be processed. In some embodiments, if a packet does not match any of the rows, it is dropped.

In the illustrated method, the Flow Tables 230 include a VLAN table, an Ethernet Source table, a FIB table, and an Ethernet Destination table. Of course, there may be other additional Flow Tables as well, in various embodiments. The method 300 begins at block 305 when a packet is received by the switch. At block 310, the Switch 205 processes the packet in accordance with a VLAN table. In an embodiment, the VLAN table matches packets based on the Port 225 the packet was received on, and the corresponding action sets the VLAN identifier of the packet based on the VLAN associated with that identified Port 225. For example, if a packet is received on a first port, and the first port is connected to a device on VLAN 110a, the Switch 205 will push VLAN 110a onto the VLAN identifier of the packet. In this way, when the packet is processed by other Flow Tables 230, the VLAN identifier of the packet matches the VLAN on which the packet originated. Additionally, in the illustrated embodiment, each row in the VLAN table also includes a "goto" action, which instructs the Switch 205 to proceed to the Ethernet Source table for further processing.

At block 315, the packet is processed in accordance with the Ethernet Source table. In an embodiment, the Ethernet Source table matches based on the destination MAC address of the packet, and transmits the packet to the FIB table or Destination MAC table. For example, if the destination MAC does not match the MAC of the router or switch, the packet is to be forwarded to another router or switch, so the packet is sent to the Destination MAC table. If the destination MAC matches the router or switch MAC, the packet should be processed by the FIB table. In existing solutions, the Ethernet Source table does not modify the VLAN ID of the packet. In one embodiment of the present disclosure, however, one action of the Ethernet Source table is to set the VLAN identifier of the packet equal to a temporary internal VLAN value corresponding to the VRF on which the packet originated. For example, suppose if a VRF A is configured to enable routing between two VLANs X and Y. In such an embodiment, the configuration of the Switch 205 may be modified to indicate that VLANs X and Y are included within VRF A (or some other arbitrary value). Then, in the Ethernet Source table, the VLAN Identifier is set to this VRF or other arbitrary value defined by the configuration. Importantly, this allows for drastically improved scalability, as will be discussed below in reference to FIG. 4.

At block 320, the packet is processed using the FIB table. In embodiments, the FIB table matches packets based on their VLAN identifier and destination address (i.e., the destination IP address). As the corresponding action, the FIB table completes layer 3 rewriting, and sets the VLAN ID to correspond to the VLAN of the destination device (e.g., based on the destination address). Finally, at block 325, the packet is processed in accordance with an Ethernet Destination table. In an embodiment, the Ethernet Destination table matches packets based on their VLAN Identifier and destination address (i.e., destination MAC address) and outputs the packet on the appropriate port, based on the destination of the of the packet.

Figure 4:
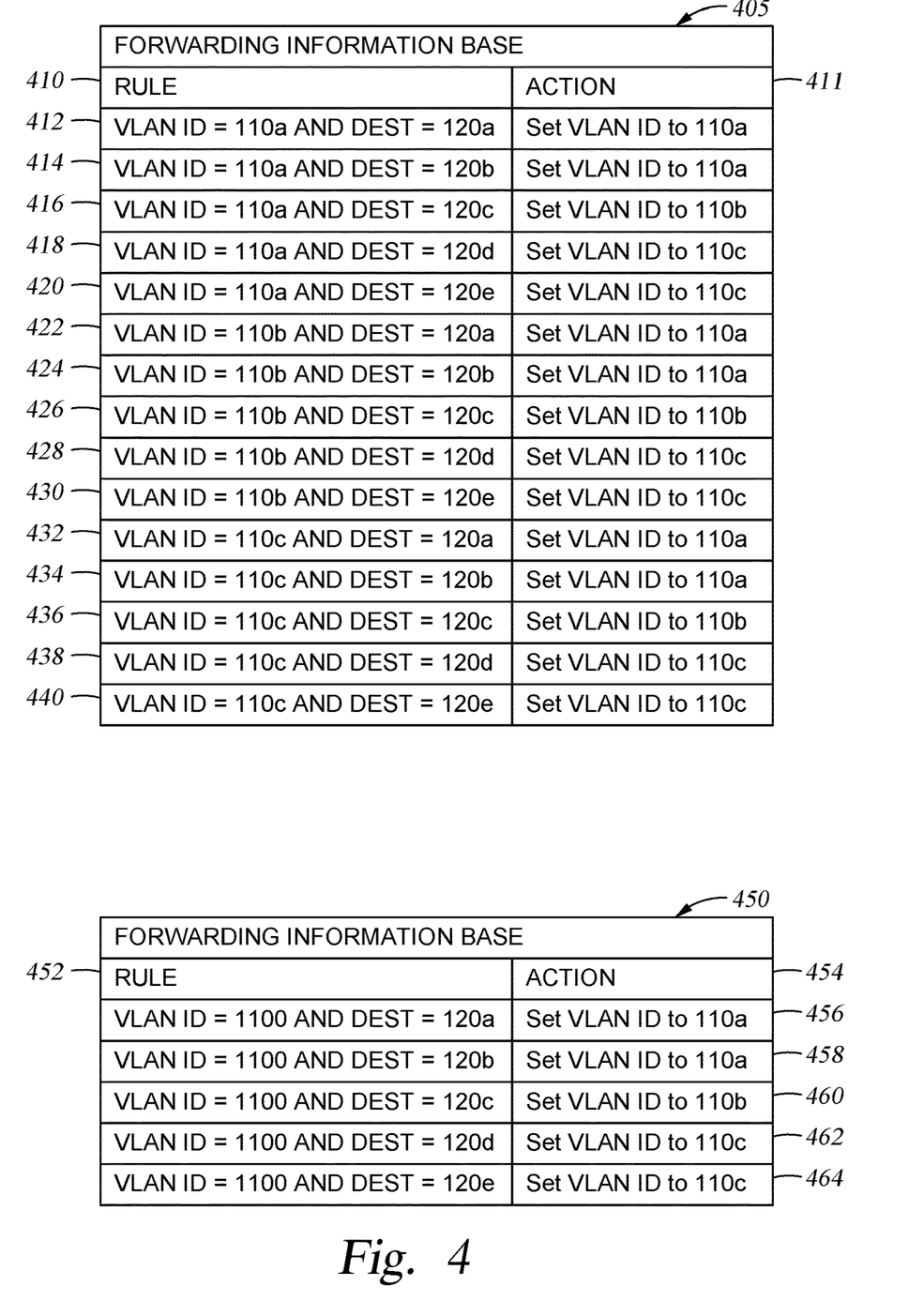
FIG. 4 illustrates two Forwarding Information Base (FIB) flow tables, according to one embodiment disclosed herein.

FIG. 4 illustrates two Flow Tables 405 and 450, according to one embodiment disclosed herein. In FIG. 4, each Flow Table is a forwarding information base (FIB), also referred to as a forwarding table. Furthermore, in the illustrated embodiment, each FIB 405 and 450 is configured for routing data among the VLANS 110a-c and Computers 120a-e. Generally, each Flow Table 405 and 450 matches the VLAN ID and destination address of incoming data with an entry in the Table 405 and 450, and sets the VLAN ID to refer to the VLAN of the destination device. The destination address in the packet corresponds to the address of the destination device, and is typically an IPv4 or IPv6 address, but can also be other means of identifying the destination device such as a MAC or IPX address. Additionally, in some embodiments, the Flow Tables 405 and 450 perform layer 3 rewriting, which involves updating one or more fields (e.g., the source and destination MAC address, the IP time-to-live (TTL), and the like).

In FIG. 4, Flow Table 405 illustrates a FIB used in a switch which does not utilize temporary internal values for the VLAN identifier, as discussed herein. In contrast, Flow Table 450 illustrates a FIB utilizing temporary internal values for VLAN identifiers, according to one embodiment of the present disclosure. As discussed above, when a packet is received by Switch 105, it is associated with a VLAN ID that identifies the VLAN it originated on. As discussed above, this VLAN ID may be set by the Computer 120a-e that transmitted the data, Switch 105, or one or more intervening routers or switches. Similarly, as discussed above, in order to route the packet to be transmitted out to the destination (through one or more ports of the Switch 105), the VLAN ID is updated to refer to the VLAN of the destination device.

As discussed above, packets are routed and forwarded through the Switch 105 by matching the fields or headers of the packet to entries in flow tables, and performing the specified action. As illustrated, Flow Table 405 includes two columns, a Rule 410 column and an Action 411 column. Similarly, Flow Table 450 includes a Rule 452 column and an Action 454 column. In FIB Tables 405 and 450, incoming packets are matched to entries or rows based on matching the VLAN ID and destination address (e.g., the destination IPv4 address) of the incoming packets with an entry.

For example, as illustrated, entry 412 in FIB 405 matches with packets with VLAN ID of 110a and a destination of Computer 120a. That is, entry 412 matches with packets that originated from a device on VLAN 110a that are destined for Computer 120a. In embodiments, the destination may be an IP address, MAC address, and the like. As illustrated, in order to ensure that no packets are dropped, the Flow Table 405 requires an entry for each VLAN to each destination. For example, as illustrated, a packet may be sent to Computer 120a from a device on VLAN 110a (which will match entry 412), a device on VLAN 110b (which will match entry 422), or a device on VLAN 110c (which will match entry 432). As can be seen, the corresponding action for each is to set VLAN ID to 110a, because Computer 120a is located on VLAN 110a.

Similarly, packets may be sent to Computer 120c from VLAN 110a (which will match entry 416), from VLAN 110b (which will match entry 426), or from VLAN 110c (which will match entry 436). In each case, the specified action is to set the VLAN ID of the packet to 110b, because Computer 120c is located on VLAN 110b. Therefore, if a temporary internal VLAN identifier is not used, the FIB Table 405 requires a number entries that equals the total number of destination devices multiplied by the number of VLANs that are reachable. For example, in the illustrated embodiment of FIG. 1, there are five destination devices (Computers 120a-e) on three distinct VLANs (VLANs 110a, 110b, and 110c). Thus, in order to enable inter-VLAN routing between VLANs 110a, 110b, and 110c, the Flow Table 405 requires fifteen entries.

In embodiments of the present disclosure, the Switch 105 can set the VLAN ID of incoming packets to an internal value for processing via the flow tables, which facilitates efficient routing. For example, as illustrated in Flow Table 450, the Switch 105 uses a value of "1000" as its temporary internal VLAN value for packets originating on VLAN 110a, 110b, or 110c. That is, when a packet is received by the Switch 105, one of the flow tables preceding Flow Table 450 includes an action to set the VLAN ID to 1000, regardless of which VLAN 110a-c the packet was received from. For example, this action may be performed while the packet is processed by the Ethernet Source table, as discussed above in relation to FIG. 3. In this way, when Flow Table 450 is reached, the VLAN ID of all packets is 1000, dramatically reducing the number of entries required. For example, as illustrated, Flow Table 450 only requires one entry for each destination address, regardless of the VLAN on which the packet originated or the number of VLANs that the Switch 105 routes to.

As illustrated, the FIB Flow Table 450 still matches packets based in part on the VLAN ID of the packet. However, because all packets associated with a particular VRF have their VLAN ID set to a predefined, temporary internal number prior to reaching the Flow Table 450, each entry need only match VLAN ID=1000 (or whatever temporary value is used by the Switch 105 to correspond to the particular VRF). This greatly improves the functionality of the Switch 105. Furthermore, in embodiments of the present disclosure, the Flow Table 450 sets the VLAN ID to refer to the destination VLAN, as discussed above, prior to outputting the packet.

In an embodiment, the selected internal value that is used as a temporary VLAN value must be unique. That is, in an embodiment, each set of VLANs that supports inter-VLAN routing must share a unique internal value that is distinct from the other internal values used for other VRFs (e.g., other sets of VLANs that are configured to route data between each other, if any) as well as distinct from the values used to identify actual VLANs on the network. In some embodiments, the Switch 105 can be configured to select its own internal value based at least in part on the VLANs that the Switch 105 routes and forwards data between. In this way, the Switch 105 can select a unique internal value. For example, suppose a Switch 105 is configured such that data can be routed between VLANs A and B (e.g., VLANs A and B are in a single VRF X), and that data can also be routed between VLANs C and D (e.g., VLANs C and D are in a single VRF Y). In such an embodiment, the Switch 105 uses two temporary internal values, one for VRF X and one for VRF Y. In this way, the VLANs within a particular VRF X or Y can route data amongst themselves, but cannot communicate with each other. In some embodiments, rather than utilizing a unique internal value, one of the external VLANs may fill this need. That is, in some embodiments, the internal value utilized may be the same identifier as one of the external VLANs in the set of VLANs configured for inter-VLAN routing.

Embodiments of the present disclosure greatly improve efficiency and scalability in several ways. As discussed above, the number of entries required in the flow table is dramatically reduced by utilizing embodiments disclosed herein. In existing methodologies, the number of entries in the FIB table is equal to the number of reachable VLANs, multiplied by the number of possible destinations. In embodiments of the present disclosure, however, the FIB tables utilizes a single entry for each destination address, and thus the number of entries required in the FIB table is equal to the number of possible destinations. This becomes increasingly important in network topologies with higher numbers of VLANs. For example, if a network topology includes 100 destination devices on 50 VLANs, existing solutions require 5,000 entries (100 destination addresses multiplied by 50 VLANs) in the FIB table. Embodiments of the present disclosure require only 100 entries to route between 100 devices on 50 VLANs, because there are 100 destination addresses.

Additionally, embodiments of the present disclosure can be implemented by administrators remotely, e.g., using Controller 115, to update the controller for the Switch 105. This requires no modification or code change on the Switch 105, and ensure that all switches and routers that support the original forwarding model can be transparently migrated to the improved model disclosed herein, without requiring software or firmware updates, and without rebooting. Additionally, when one or more new destination address (e.g., new devices) are added to the network, embodiments of the present disclosure require that a number of entries equal to the number of destination addresses be added, rather than the number of destinations times the number of VLANs. For example, suppose an administrator adds a new computer 120f (not illustrated) to the network, where the computer 120f is on its own VLAN 110d. In FIB 405, which currently has fifteen entries, an additional nine entries will be required (because there are now six destinations, multiplied by four VLANs). In contrast, FIB 450, which includes five entries, requires only a single additional entry.

Furthermore, in existing solutions, adding, removing, or modifying VLANs in the topology requires updating many entries in the FIB table of each affected Switch 105. However, embodiments of the present disclosure enable administrators to add and remove VLANs without requiring any change in the FIB table, other than adjusting the entries that actually correspond to the Computers 120a-e that are within the affected VLAN(s). For example, suppose an administrator wants to switch Computer 120e to its own VLAN 110d. In existing solutions, this change necessitates adding an additional five entries to the FIB 205, in addition to the fifteen that it already has (because there are now five destinations multiplied by four VLANs), even though no additional devices have been added to the network. Additionally, entries 420, 430, and 440 will need to be modified, because the corresponding action is incorrect based on the new location of Computer 120e. In contrast, utilizing embodiments of the present disclosure, no additional entries are required in FIB 250, and only entry 464 must be updated to refer to the new VLAN 120d.

Figure 5:
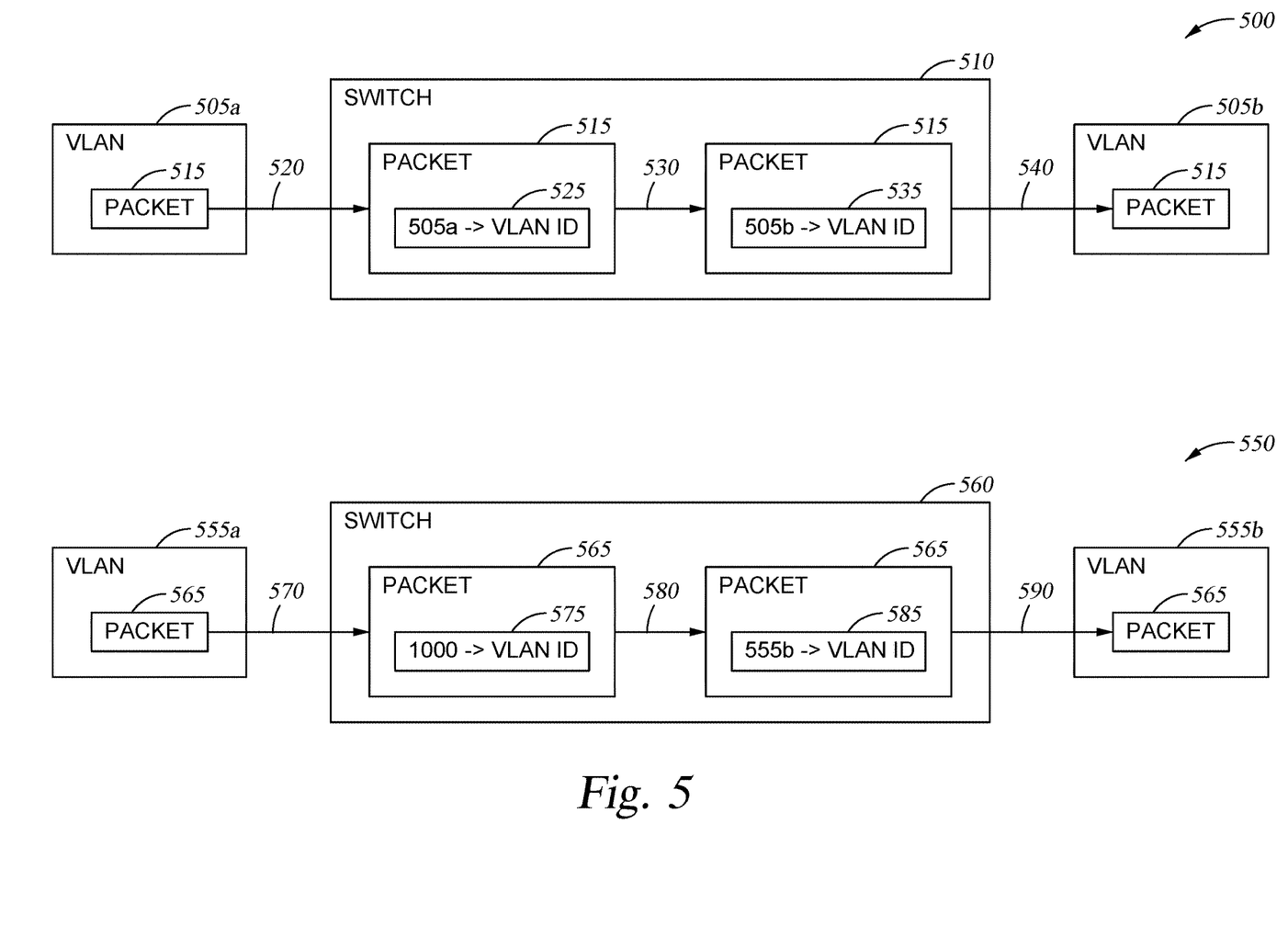
FIG. 5 is illustrates network packets being routed between VLANs by two differently configured switches, according to one embodiment disclosed herein.

FIG. 5 is illustrates Network Packets 515 and 565 being routed between VLANs by two differently configured Switches 510 and 560, according to one embodiment disclosed herein. In the illustrated embodiment, Switch 560 is configured to utilize a temporary internal VLAN value for routing between VLANs, while Switch 510 is not. As illustrated, Switch 510 routes packets between VLAN 505a and VLAN 505, while Switch 560 routes packets between VLAN 555a and VLAN 555b. In the illustrated embodiment, Packet 515 originates from a device in VLAN 505a, and Packet 565 originates from a device on VLAN 555a. In some embodiments, as discussed above, the Packet 515 may be associated with a VLAN ID or tag indicating VLAN 505a, or may not have an associated VLAN ID until it is received by Switch 510. For example, in some embodiments, the Switch 510 may determine which VLAN the Packet 515 originated on based on the port that the Packet 515 is received on or source address. In this way, the Switch 510 can associate the Packet 515 with the VLAN ID of "505a."

As illustrated by arrow 520, the Packet 515 is transmitted to the Switch 510. Further, as illustrated by block 525, the VLAN ID is set to the VLAN 505a by the Switch 510. That is, because the Switch 510 does not utilize temporary internal values as disclosed herein, the VLAN ID is set to 505a upon arrival at the Switch 510, and is not changed until later. In contrast, as illustrated by block 575, Packet 565 has its VLAN identifier set to a temporary internal value by the Switch 560. For example, the illustrated Switch 560 uses the value "1000" as its temporary value to correspond to the VRF including VLAN 555a and 555b. As discussed above, in some embodiments, the Switch 560 may first set the VLAN ID to reflect VLAN 555a (e.g., based on processing the packet according to the VLAN table), before changing the VLAN ID to the internal value corresponding to the VRF (e.g., based on processing the packet according to the Ethernet Source table).

As illustrated by arrow 530, the Packet 515 is then processed by the Switch 510. As discussed above, this may involve changing various fields based on the flow tables of the Switch 510, such as FIB Flow Table. Furthermore, because the Switch 510 does not use a temporary internal value for the VLAN ID, the FIB table of the Switch 510 will be similar to table 405 in FIG. 4 and require a separate entry for each pairing of VLANs and devices. That is, if there are six devices on four VLANs, the FIB table of Switch 510 will require 24 entries. If one additional device is added to the network, the Switch 510 will require 28 entries. As illustrated by arrow 580, the Packet 565 is also processed by the Switch 560 based on one or more additional flow tables. For example, the Switch 560 will utilize a FIB table similar to table 450. That is, because Switch 560 utilizes a temporary internal VLAN ID value, the FIB table of Switch 560 may be dramatically smaller. For example, if there are six devices on four VLANs, the FIB table of Switch 560 will require six entries, as opposed to the 24 entries that Switch 510 requires. Further, if one additional device is added to the network, the Switch 560 will require one additional entry, for a total of seven entries. In contrast, Switch 510 requires 28 entries.

This reduction in the size of the FIB table is a significant improvement to the functioning of the Switch 560. Because the size of the table is reduced, the memory and storage requirements are similarly reduced. Additionally, other computer resource requirements may be reduced because of the use of the internal temporary values. In order to output the Packet 515, the Switch 510 sets the VLAN ID of the Packet 515 to the VLAN of the destination device, as illustrated by block 535. This enables the Switch 510 to identify the appropriate port on which to output the Packet 515. Similarly, the Switch 560 sets the VLAN ID of the Packet 565 to VLAN 555b, in order to facilitate transmission of the Packet 565 out of the Switch 560. As illustrated by arrow 540, the Packet 515 is then outputted on the port(s) that are connected to VLAN 505b. Similarly, as illustrated by arrow 590, the Packet 565 is output on the port(s) connecting the Switch 560 to VLAN 555b.

Figure 6:
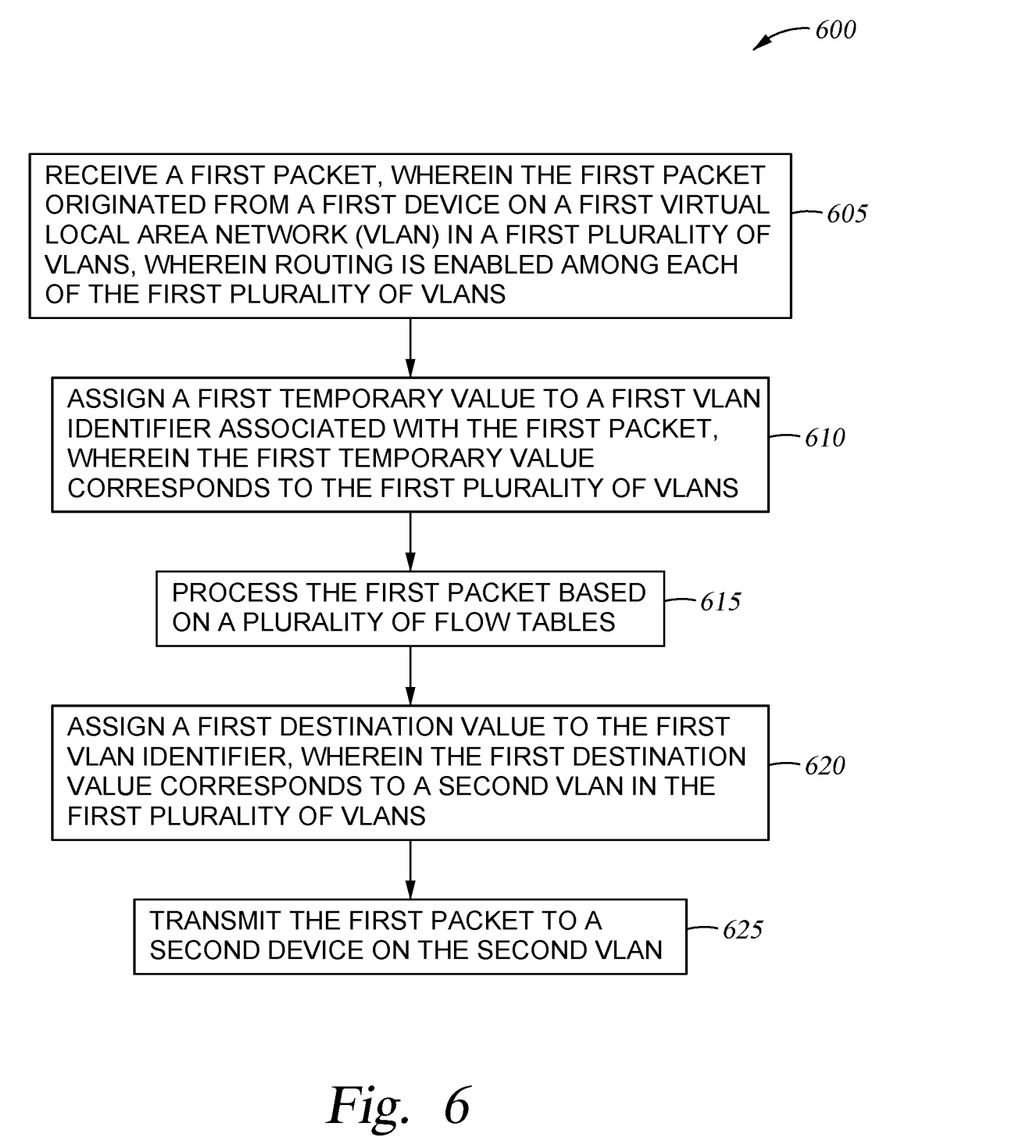
FIG. 6 is a flow diagram illustrating a method for routing network packets between VLANs, according to one embodiment disclosed herein.

FIG. 6 is a flow diagram illustrating a method 600 for routing network packets between VLANs, according to one embodiment disclosed herein. The method 600 begins at block 605, where a Network Switch 105 receives a first packet, wherein the first packet originated from a first device on a first virtual local area network (VLAN) in a first plurality of VLANs, wherein routing is enabled among each of the first plurality of VLANs. At block 610, the Switch 105 assigns a first temporary value to a first VLAN identifier associated with the first packet, wherein the first temporary value corresponds to the first plurality of VLANs. The method 600 then proceeds to block 615, where the Switch 105 processes the first packet based on a plurality of flow tables. At block 620, the Switch 105 assigns a first destination value to the first VLAN identifier, wherein the first destination value corresponds to a second VLAN in the first plurality of VLANs. Finally, at block 625, the Switch 105 transmits the first packet to a second device on the second VLAN.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., Configuration Application 260) or related data available in the cloud. For example, the Configuration Application 260 could execute on a computing system in the cloud and define the flow tables of SDN switches and routers. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   receiving a first packet at a network device, wherein the first packet originated from a first device on a first virtual local area network (VLAN) in a first plurality of VLANs in a first virtual routing and forwarding group (VRF), wherein routing is enabled among each of the first plurality of VLANs in the first VRF;
   assigning a first temporary value to a first VLAN identifier associated with the first packet, wherein the network device stores the first temporary value that corresponds to the first VRF and a second temporary value that corresponds to a second VRF;
   processing the first packet based on a plurality of flow tables;
   assigning a first destination value to the first VLAN identifier, wherein the first destination value corresponds to a second VLAN in the first plurality of VLANs, wherein routing is disabled between the first and second VLANs; and
   transmitting the first packet to a second device on the second VLAN.

2. The method of claim 1, the method further comprising:
   receiving a second packet from a third device on a third VLAN in a second plurality of VLANs in the second VRF, wherein routing is enabled among each of the second plurality of VLANs in the second VRF, and wherein routing is not enabled among the first VRF and the second VRF; and
   assigning the second temporary value to a second VLAN identifier associated with the second packet, wherein the second temporary value corresponds to the second VRF.

3. The method of claim 1, wherein the plurality of flow tables comprises a forwarding information base (FIB) that processes the first packet based at least in part on the first VLAN identifier.

4. The method of claim 3, wherein the first plurality of VLANs includes a first number of destination addresses, and wherein a number of entries of the FIB is equal to the first number of destination addresses.

5. The method of claim 3, the method further comprising:
   receiving an indication that a new device has been added to the first VLAN; and
   updating the FIB, wherein updating the FIB comprises adding exactly one new entry to the FIB, wherein the new entry corresponds to the new device.

6. The method of claim 3, the method further comprising:
   receiving an indication that a new VLAN has been added to the first plurality of VLANs;
   receiving an indication that the first device has been moved from the first VLAN to the new VLAN; and
   updating an entry in the FIB corresponding to the first device, wherein no new entries are added to the FIB.

7. The method of claim 1, wherein the method is performed by the network device, wherein the network device is configurable using a remote device.

8. A non-transitory computer program product comprising a computer-readable storage medium having computer-readable program code embodied therewith, the computer-readable program code executable by one or more computer processors to perform an operation comprising:
   receiving a first packet at a network device, wherein the first packet originated from a first device on a first virtual local area network (VLAN) in a first plurality of VLANs in a first VRF, wherein routing is enabled between each of the first plurality of VLANs in the first VRF;
   assigning a first temporary value to a first VLAN identifier associated with the first packet, wherein the network device stores the first temporary value that corresponds to the first VRF and a second temporary value that corresponds to a second VRF;
   processing the first packet based on a plurality of flow tables;
   assigning a first destination value to the first VLAN identifier, wherein the first destination value corresponds to a second VLAN in the first plurality of VLANs, wherein routing is disabled between the first and second VLANS; and
   transmitting the first packet to a second device on the second VLAN.

9. The computer program product of claim 8, the operation further comprising:
   receiving a second packet from a third device on a third VLAN in a second plurality of VLANs in the second VRF, wherein routing is enabled between each of the second plurality of VLANs in the second VRF, and wherein routing is not enabled between the first VRF and the second VRF; and
   assigning the second temporary value to a second VLAN identifier associated with the second packet, wherein the second temporary value corresponds to the second VRF.

10. The computer program product of claim 8, wherein the plurality of flow tables comprises a forwarding information base (FIB) that processes the first packet based at least in part on the first VLAN identifier.

11. The computer program product of claim 10, wherein the first plurality of VLANs includes a first number of destination addresses, and wherein a number of entries of the FIB is equal to the first number of destination addresses.

12. The computer program product of claim 10, the operation further comprising:
receiving an indication that a new device has been added to the first VLAN; and
updating the FIB, wherein updating the FIB comprises adding exactly one new entry to the FIB, wherein the new entry corresponds to the new device.

13. The computer program product of claim 10, the operation further comprising:
receiving an indication that a new VLAN has been added to the first plurality of VLANs;
receiving an indication that the first device has been moved from the first VLAN to the new VLAN; and
updating an entry in the FIB corresponding to the first device, wherein no new entries are added to the FIB.

14. The computer program product of claim 8, wherein the operation is performed by the network device, wherein the network device is configurable using a remote device.

15. A networking device comprising:
one or more computer processors; and
a memory containing a program which when executed by the one or more computer processors performs an operation, the operation comprising:
receiving a first packet, wherein the first packet originated from a first device on a first virtual local area network (VLAN) in a first plurality of VLANs in a first VRF, wherein routing is enabled between each of the first plurality of VLANs in the first VRF;
assigning a first temporary value to a first VLAN identifier associated with the first packet, wherein the networking device stores the first temporary value that corresponds to the first VRF and a second temporary value that corresponds to a second VRF;
processing the first packet based on a plurality of flow tables;
assigning a first destination value to the first VLAN identifier, wherein the first destination value corresponds to a second VLAN in the first plurality of VLANs, wherein routing is disabled between the first and second VLANs; and
transmitting the first packet to a second device on the second VLAN.

16. The networking device of claim 15, the operation further comprising:
receiving a second packet from a third device on a third VLAN in a second plurality of VLANs in the second VRF, wherein routing is enabled between each of the second plurality of VLANs in the second VRF, and wherein routing is not enabled between the first VRF and the second VRF; and
assigning the second temporary value to a second VLAN identifier associated with the second packet, wherein the second temporary value corresponds to the second VRF.

17. The networking device of claim 15, wherein the plurality of flow tables comprises a forwarding information base (FIB) that processes the first packet based at least in part on the first VLAN identifier.

18. The networking device of claim 17, wherein the first plurality of VLANs includes a first number of destination addresses, and wherein a number of entries of the FIB is equal to the first number of destination addresses.

19. The networking device of claim 17, the operation further comprising:
receiving an indication that a new device has been added to the first VLAN; and
updating the FIB, wherein updating the FIB comprises adding exactly one new entry to the FIB, wherein the new entry corresponds to the new device.

20. The networking device of claim 17, the operation further comprising:
receiving an indication that a new VLAN has been added to the first plurality of VLANs;
receiving an indication that the first device has been moved from the first VLAN to the new VLAN; and
updating an entry in the FIB corresponding to the first device, wherein no new entries are added to the FIB.

* * * * *